United States Patent
Porter et al.

(10) Patent No.: US 6,340,530 B1
(45) Date of Patent: Jan. 22, 2002

(54) MATTE COEXTRUDED NYLON FILM FOR BOOK COVERS

(75) Inventors: Simon J. Porter, Allentown, PA (US); Jeffrey D. Moulton, Morristown; Lance R. Altizer, Spotswood, both of NJ (US)

(73) Assignee: Honeywell International Inc., Morris Township, NJ (US)

( * ) Notice: Subject to any disclaimer, the term of this patent is extended or adjusted under 35 U.S.C. 154(b) by 0 days.

(21) Appl. No.: 09/560,730

(22) Filed: Apr. 28, 2000

(51) Int. Cl.$^7$ .................. B32B 27/00; B32B 27/34; B29C 47/00; B29C 47/06; B42D 3/00

(52) U.S. Cl. ............. 428/474.4; 428/472; 428/474.7; 428/474.9; 428/475.5; 428/478.8; 264/165; 264/172.19; 264/173.1; 264/173.12; 264/173.14; 264/173.15; 264/173.16; 264/173.19; 264/174.1; 264/175; 264/176.1; 281/29

(58) Field of Search ............... 428/472, 474.4, 428/474.7, 474.9, 475.5, 478.8; 264/165, 172.19, 173.1, 173.12, 173.14, 173.15, 173.16, 173.19, 174.1, 175, 176.1; 281/29

(56) References Cited

U.S. PATENT DOCUMENTS

| | | | | |
|---|---|---|---|---|
| 4,663,216 A | * | 5/1987 | Toyoda et al. | 428/212 |
| 5,006,394 A | | 4/1991 | Baird | 428/138 |
| 5,053,259 A | * | 10/1991 | Vicik | 428/36.91 |
| 5,261,899 A | | 11/1993 | Vischeret et al. | 604/437 |
| 5,534,277 A | * | 7/1996 | Ramesh et al. | 426/129 |
| 5,622,780 A | * | 4/1997 | Paleari | 428/328 |
| 5,626,969 A | * | 5/1997 | Joson | 428/474.4 |
| 5,683,802 A | * | 11/1997 | Murschall et al. | 428/325 |
| 5,994,445 A | * | 11/1999 | Kaschel et al. | 524/444 |
| 6,013,222 A | * | 1/2000 | Douglas et al. | 264/171.1 |
| 6,040,392 A | * | 3/2000 | Khanna et al. | 525/432 |
| 6,087,079 A | * | 7/2000 | Newberry et al. | 430/510 |
| 6,156,252 A | * | 12/2000 | Freedman | 264/173.15 |
| 6,217,962 B1 | * | 4/2001 | Wenth | 428/36.9 |

* cited by examiner

Primary Examiner—P. Hampton-Hightower
(74) Attorney, Agent, or Firm—Roger H. Criss

(57) ABSTRACT

Book covers and a substantially transparent, coextruded matte, bilayer nylon film which is contact transparent to a paper stock to form a soft book cover having high scratch, abrasion and mar resistance, a soft feel and good moisture curl properties. A substantially transparent, coextruded film which has a first nylon layer attached adjacent to a second nylon layer, the first nylon layer has from about 20 weight percent to about 70 weight percent of a refractory filler based on the weight of the first nylon layer.

38 Claims, No Drawings

MATTE COEXTRUDED NYLON FILM FOR BOOK COVERS

BACKGROUND OF THE INVENTION

1. Field of the Invention

The present invention pertains to book covers and more particularly to a substantially transparent, coextruded, matte, bilayer nylon film, which is contact transparent. When such a film is attached to a paper stock, it is suitable for forming a soft book cover having high scratch, abrasion and mar resistance, as well as a soft feel and good curl resistance properties when contacted with moisture.

2. Description of the Related Art

It is known in the art that paper absorbs moisture from the surrounding atmosphere quickly, depending on the relative humidity and the temperature of the air with which it is in contact. As a consequence of the absorption and desorption of water by the paper there is an unwanted change in its dimensions due to changes in moisture content. Dimensional changes in paper are caused by the swelling and contraction of the individual paper fibers.

One attempted solution to this problem has been to laminate a polymeric film to an underlying paper sheet for protecting images and text on the paper surface. Paper used as cover stock for books has typically been thermally laminated to a layer of polyethylene, polypropylene or polyester. However, lamination of paper to polyethylene, polypropylene or polyester has some inherent drawbacks since the paper and polymeric film have different hydroscopic properties. For paper stock with only one side laminated, moisture is only absorbed by the paper on one side because of the protection of the film. This increases the dimension of the paper and causes the laminated paper composite to curl towards the film. The film can be applied to both sides of the paper to prevent paper moisture growth each side, however, in most book applications it is desired to protect only one side of the paper. It would therefore be desirable to provide a book cover where only one side of the paper is laminated to a protective polymeric sheet, and which eliminates the inherent tendency of book covers to curl.

U.S. Pat. No. 5,626,969 has proposed the use of nylon as the protective film because nylon has the property of absorbing moisture with a resultant increase in dimensions similar to paper. This absorption of moisture by nylon film compensates for the moisture absorption of paper. When the moisture is absorbed by nylon, it elongates to the same degree as the paper, thus allowing the overall laminated book cover to remain flat. However, in the production of book covers, it is also desired that it have a matte surface. The protective sheets of U.S. Pat. No. 5,626,969 are not taught to have a matte surface. It would therefore be desired to produce a book cover having a film which is substantially transparent when in adhesive contact with a paper sheet, has a matte surface, offers abrasion and mar resistance and still changes its dimensions in an amount approximating that of the paper sheet to which it is attached. It is known to produce matte nylon sheets by uniformly melt blending fillers such as silica into the nylon film. However, nylon sheets including uniformly blended fillers are difficult to orient and therefore reduces film strength. U.S. Pat. Nos. 5,006,394 and 5,261,899 propose multilayer films composed of a first outer layer comprised of a polymer attached to a second layer containing fillers. However, these films are not transparent, Additionally, these patents teach that the films should not be stretched, and used for diapers rather than book covers.

SUMMARY OF THE INVENTION

The invention provides a substantially transparent, coextruded film which comprises a first nylon layer attached adjacent to a second nylon layer, the first nylon layer comprising from about 20 weight percent to about 70 weight percent of a refractory filler based on the weight of the first nylon layer.

The invention also provides a method of producing an article which comprises coextruding a first nylon layer with a second nylon layer, wherein the first nylon layer comprises from about 20 weight percent to about 70 weight percent of a refractory filler based on the weight of the first nylon layer to thereby produce a substantially transparent film article.

The invention further provides a book cover which comprises a substantially transparent, coextruded film which comprises a first nylon layer attached adjacent to a second nylon layer, the first nylon layer comprising from about 20 weight percent to about 70 weight percent of a refractory filler based on the weight of the first nylon layer; and a layer of paper attached to a surface of the second nylon layer.

It is desirable to produce a film which solves the above problems and provides a substantially contact transparent, coextruded film of a first nylon layer attached to a second nylon layer wherein the first nylon layer has about 20 weight percent to about 70 weight percent of a refractory filler. The film has a matte appearance, is contact transparent when laminated to a sheet of paper, stretchable, mar and abrasion resistant, and changes its dimensions in an amount approximating that of the paper sheet to which it is attached thus being capable of producing a book cover having reduced curl.

DETAILED DESCRIPTION OF THE PREFERRED EMBODIMENT

The film for the present invention comprises a coextruded film having a first nylon layer attached adjacent to a second nylon layer. The first nylon layer comprises from about 20 weight percent to about 70 weight percent of a refractory filler based on the weight of the first nylon layer. Preferably the second nylon layer is free of fillers. Each of the first and second layers nylon layers independently comprises one or more polyamide homopolymers or polyamide copolymers.

Each of the nylon layers may comprise one or more aliphatic, aromatic or aliphatic/aromatic polyamide homopolymer or copolymer. Polyamides suitable for use in the present invention include polyamides which are film forming. Preferred polyamides are long chain polymeric amides having recurring amide groups as part of the polymer backbone and preferably a relative formic acid viscosity (for nylon 6) of from about 40 to about 250 measured in 90 percent formic acid at a concentration of 9.2 weight percent.

Non-limiting examples of polyamides homopolymers and copolymers are poly(hexamethylene adipamide) (nylon 6,6), poly(hexamethylene sebacamide) (nylon 6, 10), poly (heptamethylene pimelamide) (nylon 7,7), poly (octamethylene suberamide) (nylon 8,8), poly (nonamethylene azelamide) (nylon 9,9), poly (decamethylene azelamnide) (nylon 10,9), poly(4-aminobutyric acid) (nylon 4), nylon 4,6; nylon 6, T; nylon 6,I; poly(6-aminohexanoic acid) (nylon 6, also known as poly(caprolactam)), poly(7-aminoheptanoic acid) (nylon 7), poly(8-aminoocatanoic acid)(nylon 8), poly(9-aminononanoic acid) (nylon 9), poly(10-aminodecanoic acid) (nylon 10), poly(11-aminondecanoic acid) (nylon 11), poly(12-aminododecanoic acid) (nylon 12) and the like.

Blends of two or more aliphatic polyamides may also be employed. Copolymers formed from recurring units of the above referenced aliphatic polyamides can be used in the fabrication of the polyamide layers. By way of illustration and not limitation, such aliphatic polyamide copolymers include caprolactam/hexamethylene adipamide copolymer (nylon 6/6,6), hexamethylene adipamide/caprolactam copolymer (nylon 6,6/6), trimethylene adipamide/hexamethylene azelaiamide copolymer (nylon trimethyl 6,2/6,9), hexamethylene adipamide/hexamethylene-azelaiamide/caprolactam copolymer (nylon 6,6/6,9/6) and the like. Preferred aliphatic polyamides for use in the practice of this invention are poly(caprolactam) and poly(hexamethylene adipamide), and a copolymer of poly(caprolactam) with polyhexamethylene adipamide. Polyamides used in the practice of this invention may be obtained from commercial sources or prepared in accordance with known preparatory techniques. For example, polycaprolactam can be obtained from Honeywell International Inc., Morristown, N.J. under the trademark CAPRON®. Suitable variants of CAPRON® for use as a first polyamide in the present invention include CAPRON® 8200 nylon, a balanced nylon 6 having a formic acid viscosity (FAV) of 75, CAPRON® 1767 nylon, a balanced nylon 6 having an FAV of 35, and CAPRON® 8224HSL nylon, a heat stabilized, lubricated nylon 6 having an FAV of 60. A suitable variant of CAPRON® nylon for use as a second polyamide includes CAPRON® 1250 nylon, an amine-terminated nylon 6 with a FAV of 60 and having terminal amino groups of 70 to 78 milliequivalents per gram.

Exemplary of aliphatic/aromatic polyamides include poly (2,2,2-trimethyl hexamethylene terephthalamide), poly(m-xylylene adipamide) (MXD6), poly(p-xylylene adipamide), poly(hexamethylene terephthalamide), poly (dodecamethylene terephthalamide), and the like. Blends of two or more aliphatic/aromatic polyamides can also be used. The most preferred aliphatic/aromatic polyamide is poly(m-xylylene adipamide). Aliphatic/aromatic polyamides can be prepared by known preparative techniques or can be obtained from commercial sources.

The number average molecular weight of the polyamide may widely vary. Usually, the aliphatic polyamide is of a "film-extrusion molecular weight", meaning an average molecular weight that is sufficiently high to form a free standing film but sufficiently low to allow melt processing of the blend into a film. Such number average molecular weights are well known to those of skill in the film forming art and are usually at least about 5,000 as determined by the formic acid viscosity method. In this method (ASTM D-789), a solution of 11 grams of aliphatic polyamide in 100 ml of 90% formic acid at 25° C. is used. In the preferred embodiments of the invention, the number average molecular weight of the aliphatic polyamide ranges between about 5,000 to about 100,000, and in the particularly preferred embodiments it ranges between about 10,000 to about 60,000. Most preferred are those in which the number average molecular weight of the aliphatic polyamide is from about 20,000 to about 40,000. Also suitable for use herein are polyamide interpolymers comprised of a polyamide and one or more comonomers. Non-limiting examples of such comonomers include acrylic or methacrylic acid and/or their derivatives, such as acrylonitrile, acrylamide, methyl, ethyl, propyl, butyl, 2-ethylhexyl, hexyl and tridecylesters of acrylic or methacrylic acid, vinyl esters such as vinyl acetate and vinyl propionate, vinyl aromatic compounds such as styrene, alpha-methyl styrene, and vinyl toluenes and vinyl ethers such as vinyl isobutyl ether.

It is further noted that the aforementioned polyamides containing various terminal functionality are also suitable for use in the present invention. Preferred are polycaprolactams (nylon 6) containing a carboxyl group attached to one end and an acetamide group attached to the other end of the polymer chain, an amino group attached to both ends of the polymer chain and a carboxyl group attached to one end and an amino group attached to the other end of the polymer chain. Particularly preferred is a polycaprolactam having a carboxyl group attached to one end and an amino group attached to the other end of the polymer chain. General procedures useful for the preparation of polyamides are well known to the art.

The first nylon layer may be formed by blending its nylon component with a refractory filler. In a preferred embodiment, the refractory filler is blended with the nylon precursor to break up any agglomerates, and then the precursor is polymerized. For example, in the case of nylon 6 homopolymer, the filler is blended with caprolactam and then the caprolactam polymerized into nylon 6. For purposes of this invention, a refractory filler is a material having the ability to retain its physical shape and chemical identity when subjected to high temperatures, i.e. at least as high as the melting point of the polyamide in the first nylon layer. Preferred refractory fillers are refractory oxides and most preferably refractory metal oxides.

Suitable fillers include inorganic fillers, including those of a granular nature, as wells as mixtures thereof. The fillers include glass, silica glass, ceramic, asbestos, aluminum oxide, silicon carbide, gypsum, as well as other inorganic and carbon fibers. Useful fillers also include wollastonite, sericite, asbestos, talc, mica, clay, kaolin, bentonite, and silicates, including alumina silicate, and potassium titanate. Other granular fillers include metal oxides, such as alumina, silica, magnesium oxide, zirconium oxide, titanium oxide, titania, zinc oxide, carbonates such as calcium carbonate, magnesium carbonate, and dolomite, sulfates including calcium sulfate and barium sulfate, boron nitride, glass beads, silicon carbide, as well as other materials not specifically denoted here. These fillers may be hollow, for example glass microspheres, silane balloon, carbon balloon, and hollow glass fiber. Preferred fillers are silica, alumina, zinc oxide, titania, chromium oxide, germanium oxide and other mixed metal oxides, kaolin, calcined kaolin minerals, pyrophyllite, calcined pyrophyllite, montmorillonite, calcined montmorillonite, mica and mixtures thereof with silica being the most preferred filler. The refractory filler is preferably present in an amount of from about 5 weight percent to about 50 weight percent and more preferably from 14 weight percent to 25 weight percent based on the weight of the first nylon layer. The refractory filler preferably has an average particle size in the range of from about 0.5 µm to about 5 µm and more preferably from about 1.5 µm to about 2 µm. In a particularly preferred embodiment, the particle size of the filler has a bimodal distribution wherein from 0 to about 25% and preferably from about 10% to about 20% of the refractory filler has an average particle size in the range of from about 4 µm to about 5 µm and the balance of the refractory filler has an average particle size in the range of from about 1.5 µm to about 2 µm. The fillers may be treated with silane, titanate or another coupling agent.

Each of the first and second nylon layer compositions may optionally also include one or more conventional additives whose uses are well known to those skilled in the art. The use of such additives may be desirable in enhancing the processing of the compositions as well as improving the products or articles formed therefrom. Examples of such include: oxidative and thermal stabilizers, lubricants, mold release agents, flame-retarding agents, oxidation inhibitors, dyes, pigments and other coloring agents, ultraviolet light stabilizers, nucleators, plasticizers, as well as other conventional additives known to the art. Such may be present in an amount of about 10% or less based on the weight of the layer. These conventional additives may be incorporated into compositions at any suitable stage of the production process, and typically are introduced in the mixing step and included in an extrudate.

By way of example, representative ultraviolet light stabilizers include various substituted resorcinols, salicylates, benzotriazole, benzophenones, and the like. Suitable exemplary lubricants and mold release agents include stearic acid, stearyl alcohol, stearamides. Exemplary flame-retardants include organic halogenated compounds, including decabromodiphenyl ether and the like as well as inorganic compounds. Suitable coloring agents including dyes and pigments include cadmium sulfide, cadmium selenide, titanium dioxide, phthalocyanines, ultramarine blue, nigrosine, carbon black and the like. Representative oxidative and thermal stabilizers include the Period Table of Element's Group I metal halides, such as sodium halides, potassium halides, lithium halides; as well as cuprous halides; and further, chlorides, bromides, iodides. Also, hindered phenols, hydroquinones, aromatic amines as well as substituted members of those above mentioned groups and combinations thereof. Exemplary plasticizers include lactams such as caprolactam and lauryl lactam, sulfonamides such as o,p-toluenesulfonamide and N-ethyl, N-butyl benylnesulfonamide, and combinations of any of the above, as well as other plasticizers known to the art.

In a preferred embodiment, the first nylon layer further comprises an elastomeric ingredient in the layer. Suitable elastomers non-exclusively include rubbers, styrene-butadiene copolymers, maleated styrene-butadiene-styrene copolymers and hydrogenated styrene butadiene block copolymers in amounts of from about 5% to about 25%, and more preferably from about 5% to about 10% by weight of the first nylon layer. The elastomer component provides the layer with a softer feel, toughens the layer and surprisingly contributes to its matte finish.

The composition may be formed by dry blending solid particles or pellets of the polyamide together with the filler and optional other components and then melt blending the mixture in a suitable mixing means such as an extruder, a roll mixer or the like. Typical melting temperatures range from about 175° C. to about 260° C., preferably from about 215° C. to about 225° C., and more preferably from about 220° C. to about 223° C. for nylon 6. Blending is conducted for a period of time required to attain a substantially uniform blend. Such may easily be determined by those skilled in the art. If desired, the composition may be cooled and cut into pellets or other shapes for further processing, it may then be formed into films and optionally uniaxially or biaxially stretched by means well known in the art.

The films of this invention may be produced by conventional methods useful in producing films, including coextrusion and blown film techniques. In the most preferred method, the film is formed by coextrusion. For example, the compositions of the first and second nylon layers are preblended and fed into infeed hoppers of extruders, each extruder handling the material for one of the layers, or each polyamide may be fed into infeed hoppers of an extruder and then blended in the extruder. The melted and plasticated streams from the individual extruders are fed into a single manifold co-extrusion die. While in the die, the layers are juxtaposed and combined, and then emerge from the die as a multiple layer film. After exiting the die, the film is cast onto a first controlled temperature casting roll, passes around the first roll, and then onto a second controlled temperature roll, which is normally cooler than the first roll. The controlled temperature rolls largely control the rate of cooling of the film after it exits the die. In a preferred embodiment of this invention typical operating temperatures for the first and second controlled temperatures rolls are approximately 38° C. and 32° C. Once cooled and hardened, the resultant film is preferably substantially transparent. Processes of coextrusion to form films are generally known in the art. Processes of coextrusion to form film and sheet laminates are generally known. See for example in "Modern Plastics Encyclopedia", Vol. 56, No. 10A, pp. 131–132, McGraw Hill, Oct. 1979. One advantage of coextruded films is the formation of a multilayer film in a one process step by combining molten layers of each of the layers of polyamide into a unitary film structure. In order to produce a multilayer film by a coextrusion process, it is necessary that the constituents used to form each of the individual films be compatible with the film extrusion process. One skilled in the art can readily weigh the above-noted compatibility in order to select polymers having desirable physical properties and determine the optimal combination of relative properties in adjacent layers without undue experimentation. If a coextrusion process is used, it is important that the constituents used to form the multilayer film be compatible within a relatively close temperature range in order to permit extrusion through a common die.

In another method, the film forming apparatus may be one which is referred to in the art as a "blown film" apparatus and includes a multi-manifold circular die head for bubble blown film through which the first and second nylon compositions are forced and formed into a film "bubble". The "bubble" is ultimately collapsed and formed into a film.

The coextruded nylon films produced according to the present invention may be oriented by stretching or drawing the films at draw ratios of from about 1.1:1 to about 10:1, and preferably at a draw ratio of from about 1.5:1 to about 5:1. The term "draw ratio" as used herein indicates the increase of dimension in the direction of the draw. Therefore, a film having a draw ratio of 2:1 has its length doubled during the drawing process. Generally, the film is drawn by passing it over a series of preheating and heating rolls. The heated film moves through a set of nip rolls downstream at a faster rate than the film entering the nip rolls at an upstream location. The change of rate is compensated for by stretching in the film. Alternatively the film may be oriented through a simultaneous orientation process or by the "double bubble" blown film process, both of which used heated air , rather than heated rolls, to facilitate orientation.

The film may be stretched or oriented in any desired direction using methods well known to those skilled in the art. The film may be stretched uniaxially in either the longitudinal direction coincident with the direction of movement of the film being withdrawn from the film forming apparatus, also referred to in the art as the "machine direction", or in as direction which is perpendicular to the machine direction, and referred to in the art as the "transverse direction", or biaxially in both the longitudinal direction and the transverse direction. Typical process and range of conditions for monoaxially oriented polyamide films are disclosed, for example, in U.S. Pat. No. 4,362,385. Preferably the film has a total thickness of from about 8 $\mu$m to about 40 $\mu$m, preferably from about 10 $\mu$m to about 35 $\mu$m, and more preferably from about 10 $\mu$m to about 30 $\mu$m, wherein the thickness of the first nylon layer comprises from about 5% to about 25% and preferably from about 5% to about 15% of the total thickness of the first nylon layer and the second nylon layer. While such thicknesses are preferred for providing a readily flexible film, it is to be understood that other film thicknesses may be produced to satisfy a particular need and yet fall within the scope of the present invention. The film preferably is contact transparent, that is it is substantially transparent when contacted to a surface such as paper. By substantially transparent, it is meant that the film preferably has a haze of $\leq 85\%$ as measured by ASTM D1003. The first nylon layer also has a surface gloss at a viewing angle of 60° of from about 5 to about 10, preferably from about 5.5 to about 8.5 as measured according to ASTM D2457.

In another embodiment of the invention, the film is attached on the second nylon layer side to another thermoplastic polymer film layer. Non-limiting examples of other optional polymeric layers and adhesive or tie layers which can be used in the film laminate of the present invention are disclosed in U.S. Pat. Nos. 5,055,355; 3,510,464; 3,560,461; 3,847,845; 5,032,656; 3,585,177; 3,595,740; 4,284,674; 4,058,647; and 4,254,169. Illustrative of such additional optional layers are polymeric layers formed of homopolymers and copolymers formed from $\alpha,\beta$-unsaturated monomers, such as, for example, polyolefin homopolymers, polyvinyl alcohol, ethylene/propylene copolymer, ethylene/vinyl alcohol copolymer and blends thereof. Preferred polyolefins are those prepared from alpha-olefins, most preferably ethylene polymers, copolymers, and terpolymers. The above polyolefins may be obtained by any known process. The polyolefin may have a weight average molecular weight of about 1,000 to about 1,000,000, and preferably about 10,000 to about 500,000. Preferred polyolefins are polyethylene, polypropylene, polybutylene and copolymers, and blends thereof. The most preferred polyolefins are polyethylene and polypropylene.

Such polymer layers may be applied to the second nylon layer by extrusion coating or lamination. Between the second nylon layer and the additional polymer layer may be an adhesive layer, also referred to in the art as a "tie" layer. Any adhesive known in the art for use with nylon and the selected polymer are suitable for use in this invention. Illustrative of suitable adhesive polymers includes modified polyolefin compositions such as crystalline or crystallizable poly($\alpha$-olefins) and their copolymers, wherein the $\alpha$-olefin monomers have between about 2 and about 6 carbon atoms. Non-limiting examples of suitable polyolefins include low, medium or high density polyethylene, linear low density polyethylene, polypropylene, polybutylene, polybutene-1, polypentene-1, poly-3-methylbutene-1, poly-4-methylpentene-1, polyhexene, and copolymers and blends thereof. Of these, preferred polyolefins are polyethylene, polypropylene, polybutylene, and copolymers and blends thereof, with polyethylene being most preferred. The modified polyolefins suitable for use in conjunction with the present invention include copolymers and graft copolymers of a polyolefin and a constituent having a functional moiety selected from the group consisting of unsaturated polycarboxylic acids and acid anhydrides thereof. The unsaturated polycarboxylic acids and anhydrides include maleic acid, maleic anhydride, fumaric acid, crotonic acid, citraconic anhydride, itaconic anhydride and the like. Preferred of these are anhydrides, of which the most preferred is maleic anhydride.

The preferred modified polyolefin comprises, based upon the total weight of the modified polyolefin, from about 0.001 percent to about 10 percent, preferably from about 0.005 percent to about 5 percent, and more preferably from about 0.01 percent to about 2 weight percent of a functional moiety selected from the group consisting of unsaturated polycarboxylic acids and acid anhydrides thereof. The modified polyolefins suitable for use in this invention include compositions described in U.S. Pat. Nos. 3,481,910; 3,480,580; 4,612,155, and 4,751,270. The modified polyolefin of the present invention can further comprise between about 0 to about 40 weight percent, based on the total weight of the modified polyolefin, of thermoplastic elastomers and alkyl esters as described in U.S. Pat. No. 5,139,878. Illustrative of suitable elastomers and alkyl esters nonexclusively include ethylene methylacrylate copolymer, ethylene butylacrylate copolymer, etc. The modified polyolefins suitable for the present invention can be obtained from commercial sources. Alternatively, such modified polyolefins may be produced in accordance with the processes known to the art, including but not limited to the processes described in the aforementioned U.S. Pat. Nos. 3,481,910; 3,480,580; 4,612,155 and 4,751,270. Maleated polyolefins are preferred.

The multilayer films of the present invention can be produced by lamination whereby a multilayer film structure is formed from pre-fabricated film plies. Typically, laminating is done by positioning the individual layers of the inventive film on one another under conditions of sufficient heat and pressure to cause the layers to combine into a unitary film. Typically the nylon and optional polymer layers are positioned on one another, and the combination is passed through the nip of a pair of heated laminating rollers by techniques well known in the art such as those described in U.S. Pat. No. 3,355,347. Lamination heating may be done at temperatures ranging from about 75° C. to about 175° C., preferably from about 100° C. to about 175° C. at pressures ranging from about 5 psig (0.034 MPa) to about 100 psig (0.69 MPa) for from about 5 seconds to about 5 minutes, preferably from about 30 seconds to about 1 minute. Alternatively the sealant layer may be placed on the matte film via an extrusion coating process, which is well understood by those skilled in the art.

In another preferred embodiment of the invention, the film may be attached to a layer of paper and cut to form a book cover. This may be done by attaching either the second nylon layer or the additional polymer layer to the layer of paper, such as by laminating their surfaces together via an intermediate pressure sensitive or heat sensitive adhesive.

The following non-limiting examples serve to illustrate the invention. However, the invention should not be considered as being limited to the details thereof.

Gloss/matte measurements were made with a Byk-Gardner Micro-Gloss hand-held instrument measuring specular gloss at 60° from the film surface. The test is conducted in accordance with ASTM D2457 Standard Test Method.

Haze measurements were made with a Byk-Gardner Haze-Gard Plus instrument in accordance with ASTM D1003 Standard Test Method.

EXAMPLES 1 to 9

Each of the examples were made using the same extruder machine conditions.

A two layer co-extruded laminate was made from poly-($\epsilon$-caprolactam) (nylon 6) and a nylon/filler masterbatch. The poly-($\epsilon$-caprolactam) polymer used was Capron® B73ZP made by Honeywell International Inc. had a relative formic acid viscosity of 73 measured in 90% formic acid and a 9.2% concentration by weight. The poly-($\epsilon$-caprolactam) was extruded through a 3.5 inch (8.89 cm) diameter Davis Standard Extruder having a temperature profile of Zone 1—570° F.(299° C.), Zone 2—570° F.(299° C.), Zone 3—500° F.(260° C.), Zone 4—490° F.(254° C.), Zone 5—490° F.(254° C.) and adapter Zone 1—490° F.(254° C.). The extruder was operated such that the melt temperature of the nylon was 503° F.(262° C), and an extruder output of 119 pounds (53.98 kg) per hour.

The filled nylon polymer was extruded through a 2 inch (5.08 cm) diameter Reifenhauser Extruder. The extruder had a temperature profile which included Zone 1—500° F.(260° C.), Zone 2—500° F.(260° C.), Zone 3—510° F.(266° C.), Zone 4—500° F.(260° C.), and an adapter Zone 1—490° F.(254° C.). The operating conditions of the extruder were such that they produced a melt temperature of 509° F.(265° C.), and an extruder output of 22 pounds (9.98 kg) per hour. The extrudate from the extruders was put through a feed block coextrusion adapter manufactured by the Johnson Plastic Corporation and operating at an adapter temperature of Zone 1—490° F. (254° C.), and Zone 2—490° F.(254° C.). The flat cast die temperatures were operated at 495° F.(254° C.). The coextruded film was then cast onto a series of heated rolls. The total extrusion output was 141 pounds (64 kg) per hour.

The film was oriented monoaxially. The oriented film had a gauge of 0.68 mils (0.0254 mm).

As described, the bulk (90%) of the extruded film is pure nylon with a 10% skin of the filled nylon to provide a matte surface. The filled nylon materials used are specified in the following examples. In Examples 1 through 3, the pure nylon extrudate contained 0.008% talc based nucleating agent to promote even spherulite growth during crystallization. This facilitates formation of a clear haze free film.

EXAMPLE 1

The filled nylon used was a silica filled, nylon 6 masterbatch from Clariant which has an average particle size of the filler of 1 $\mu$m. The masterbatch contains about 7% (wt/wt) silica. This material (10% wt/wt) was coextruded with (90% wt/wt) Capron B73ZP nylon 6 containing 0.008% talc (nucleating agent). The MD orientation was ×2.9. The gloss value for this material at 60° was 33.6 gloss units (G.U.) on the matte (filled nylon) side and 83.3 G.U. on the gloss (nylon) side. The haze level measured was 25%.

EXAMPLE 2

The filled nylon was a product from EMS-Chemie AG called Grilon FE5269 (a nylon 6 blend with 5% silica with a particle size less than 5 $\mu$m). This material (10% skin) was coextruded with (90% bulk) Capron B73ZP nylon 6 containing 0.008% talc (nucleating agent). The MD orientation was ×2.9. The gloss value for this material at 60° was 57.3 G.U. on the matte (filled nylon) side and 82.6 G.U. on the gloss (nylon) side. The haze level measured was 23%.

EXAMPLE 3

The filled nylon was a product from Unitika called A1030QW. This is a nylon 6 material polymerized in the presence of silica particles (4.5% wt/wt) with an average particle size of less than 5 $\mu$m. This material (10% skin) was coextruded with (90% bulk) Capron B73ZP nylon 6 containing 0.008% talc (nucleating agent). The MD orientation was ×2.9. The gloss value for this material at 60° was 39.5 G.U. on the matte (filled nylon) side and 87.1 G.U. on the gloss (nylon) side. The haze level measured was 28%.

EXAMPLE 4

In Examples 1 through 3, the pure nylon extrudate contained 0.008% talc based nucleating agent to promote even spherulite growth during crystallization. This facilitates formation of a clear haze free film. In this example, the nucleating agent was not used in the nylon substrate and the same filled nylon skin as described in example 3 was used. The MD orientation was ×2.9. The gloss value for this material at 60° was 32.5 G.U. on the matte (filled nylon) side and 81.4 G.U. on the gloss (nylon) side. The haze level measured was 30%.

EXAMPLE 5

The filled nylon layer (10% by weight of the total structure) was made of a blend of 98% of the Clariant silica masterbatch of Example 1 with 2% (by weight) of a titanium dioxide/nylon 6 masterbatch (containing 4% titanium dioxide in nylon 6) from Clariant). The mixing was done by drum tumbling pellets of the two masterbatches together for 20 minutes. No further mixing was done. This material (10% skin) was coextruded with (90% bulk) Capron B73ZP nylon 6. The nylon substrate (90%) utilized no nucleating agent as described in example 4. The MD orientation was ×2.9. The gloss value for this material at 60° was 30.5 G.U. on the matte (filled nylon) side and 83.6 G.U. on the gloss (nylon) side. The haze level measured was 32%.

EXAMPLE 6

The filled nylon used was a silica filled masterbatch from Clariant sold under the product code ABA0642400. The average particle size of the filler is quoted as 1 μm. The masterbatch contains about 14% (wt/wt) silica. This material (10% skin) was coextruded with (90% bulk) Capron B73ZP nylon 6 containing no nucleating agent. The MD orientation was ×2.9. The gloss value for this material at 60° was 17 G.U. on the matte (filled nylon) side and 89 G.U. on the gloss (nylon) side. The haze level measured was 49%.

EXAMPLE 7

Example 4 was repeated except the films were unoriented. The gloss value for this material at 60° was 48 G.U. on the matte (filled nylon) side and 89 G.U. on the gloss (nylon) side. The haze level measured was 41%.

EXAMPLE 8

Example 7 was repeated., except that the masterbatch of Example 3 was blended (95% wt/wt) with a styrene-butadiene rubber material (5% wt/wt) (Tuflec L515) from Asahi Chemical Industry Co. Ltd. The gloss value for this material at 60° was 36 G.U. on the matte (filled nylon) side and 89 G.U. on the gloss (nylon) side. The haze level measured was 49%.

EXAMPLE 9

Example 8 was repeated except the masterbatch of Example 3 was blended (90% w/w) with Tuftec L515 styrene-butadiene rubber (10% wt/wt). The gloss value for this material at 60° was 34 G.U. on the matte (filled nylon) side and 92 G.U. on the gloss (nylon) side. The haze level measured was 57%.

EXAMPLES 10 to 12

Films from examples 7, 8 and 9 were biaxially oriented (involving heating the film to 221° F.(105° C.), a stretch of 250% in the machine direction and 250% in the transverse direction) to give examples 10, 11 and 12 respectively.

| Example | Gloss (60°) Matte Side | Gloss (60°) Gloss Side | Haze (%) |
|---|---|---|---|
| 10 | 14 | 16 | 38 |
| 11 | 11 | 14 | 73 |
| 12 | 8 | 14 | 77 |

The film from each example above is thermally laminated to printed 12–15 lb paper board to make book covers. The adhesive for this process is a 0.5–1.0 mil EVA film laminated to the matte nylon coextrusion thermally or by extrusion coating. The board stock is sheet cut and magazine feed into an offset lithographic printer and then thermally laminated to the roll fed matte nylon overlaminate.

It can be seen that the present invention provides excellent book cover material.

While the present invention has been particularly shown and described with reference to preferred embodiments, it will be readily appreciated by those of ordinary skill in the art that various changes and modifications may be made without departing from the spirit and scope of the invention. It is intended that the claims be to interpreted to cover the disclosed embodiment, those alternatives which have been discussed above and all equivalents thereto.

What is claimed is:

1. A substantially transparent, coextruded film which comprises a first nylon layer attached adjacent to a second nylon layer, the first nylon layer comprising from about 20 weight percent to about 70 weight percent of a refractory filler based on the weight of the first nylon layer.

2. The film of claim 1 wherein the refractory filler comprises one or more materials selected from the group consisting of silica, alumina, zinc oxide, titania, chromium oxide, germanium oxide, mixed metal oxides, kaolin, calcined kaolin minerals, pyrophyllite, calcined pyrophyllite, montmorillonite, calcined montmorillonite, mica and mixtures thereof.

3. A film of claim 1 wherein the refractory filler comprises a refractory metal oxide.

4. The film of claim 1 wherein the refractory filler comprises silica.

5. The film of claim 1 wherein the refractory filler is present in an amount of from about 5 weight percent to about 50 weight percent based on the weight of the first nylon layer.

6. The film of claim 1 wherein the refractory filler is present in an amount from 14 weight percent to 25 weight percent based on the weight of the first nylon layer.

7. The film of claim 1 wherein the refractory filler an average particle size in the range of from about 0.5 μm to about 5 μm.

8. The film of claim 1 wherein the refractory filler has an average particle size in the range of from about 1.5 μm to about 2 μm.

9. The film of claim 1 wherein from 0 to about 25% of the refractory filler has an average particle size in the range of from about 4 μm to about 5 μm and the balance of the refractory filler has an average particle size in the range of from about 1.5 μm to about 2 μm.

10. The film of claim 1 wherein the first nylon layer further comprises an elastomer.

11. The film of claim 10 wherein said elastomer is selected from the group consisting of styrene-butadiene copolymers, maleated styrene-butadiene-styrene copolymers and hydrogentated styrene butadiene block copolymers.

12. The film of claim 1 which has a total thickness of from about 8 μm to about 40 μm.

13. The film of claim 1 in which the thickness of the first nylon layer comprises from about 5% to about 25% of the total thickness of the first nylon layer and the second nylon layer.

14. The film of claim 1 wherein the second nylon layer is substantially free of fillers.

15. The film of claim 1 which is monoaxially oriented.

16. The film of claim 1 which is biaxially oriented.

17. The film of claim 1 which is monoaxially or biaxially oriented in an amount of from about 1.5 to about 5 times in either the longitudinal direction, the transverse direction or independently in each of the longitudinal direction and transverse directions.

18. The film of claim 1 further comprising a thermoplastic polymer layer adjacent to the second nylon layer.

19. The film of claim 18 wherein the thermoplastic polymer layer comprises a polyolefin.

20. The film of claim 18 wherein the thermoplastic polymer layer is attached to the second nylon layer by an intermediate adhesive layer.

21. The film of claim 20 wherein the adhesive is heat activatable.

22. The film of claim 1 further comprising a layer of paper attached to the second nylon layer.

23. The film of claim 18 further comprising a layer of paper attached to the thermoplastic polymer layer.

24. The film of claim 20 further comprising a layer of paper attached to the thermoplastic polymer layer.

25. The film of claim 1 wherein each of the nylon layers comprise nylon 6.

26. The film of claim 1 wherein the first nylon layer has a surface gloss at a viewing angle of 60° of from about 5 to about 10 as measured according to ASTM D2457.

27. A method of producing an article which comprises coextruding a first nylon layer with a second nylon layer, wherein the first nylon layer comprises from about 20 weight percent to about 70 weight percent of a refractory filler based on the weight of the first nylon layer to thereby produce a substantially transparent film article.

28. A method of claim 27 wherein the second nylon layer is substantially free of fillers.

29. The method of claim 27 further comprising monoaxially orienting the article.

30. The method of claim 27 further comprising biaxially orienting the article.

31. The method of claim 27 further comprising attaching a thermoplastic layer to the second nylon layer.

32. The method of claim 27 further comprising attaching a thermoplastic layer to the second nylon layer by extrusion coating the thermoplastic layer to the second nylon layer.

33. The method of claim 27 further comprising attaching a thermoplastic layer to the second nylon layer by an intermediate adhesive layer.

34. The method of claim 27 further comprising attaching a layer of paper to the second nylon layer.

35. The method of claim 31 further comprising attaching a layer of paper to the thermoplastic layer.

36. A book cover which comprises a substantially transparent, coextruded film which comprises a first nylon layer attached adjacent to a second nylon layer, the first nylon layer comprising from about 20 weight percent to about 70 weight percent of a refractory filler based on the weight of the first nylon layer; and a layer of paper attached to a surface of the second nylon layer.

37. The book cover of claim 36 wherein each of the nylon layers comprise nylon 6.

38. The book cover of claim 27 wherein said coextruded film is oriented.

* * * * *